(12) United States Patent
Gajji et al.

(10) Patent No.: US 11,428,615 B2
(45) Date of Patent: Aug. 30, 2022

(54) ACTIVE SENSOR FOR TORQUE MEASUREMENT IN A VISCOMETER

(71) Applicant: Halliburton Energy Services, Inc., Houston, TX (US)

(72) Inventors: Bhargav Gajji, Cypress, TX (US); Ketan Chimanlal Bhaidasna, Houston, TX (US); Richard Gary Morgan, Channelview, TX (US); Subrahmanyam Surya Venkata Sista, Hyderabad (IN); Abhhilash Mamilla, Hyderabad (IN); Sandeep Mavinkal Kizhakke Veedu, Houston, TX (US); Andrew David Vos, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 406 days.

(21) Appl. No.: 16/489,104

(22) PCT Filed: Mar. 31, 2017

(86) PCT No.: PCT/US2017/025280
§ 371 (c)(1),
(2) Date: Aug. 27, 2019

(87) PCT Pub. No.: WO2018/182673
PCT Pub. Date: Oct. 4, 2018

(65) Prior Publication Data
US 2020/0064245 A1 Feb. 27, 2020

(51) Int. Cl.
*G01N 11/14* (2006.01)

(52) U.S. Cl.
CPC ........ *G01N 11/14* (2013.01); *G01N 2011/147* (2013.01); *G01N 2203/0094* (2013.01)

(58) Field of Classification Search
CPC .................. G01N 11/10; G01N 11/14; G01N 2011/147
See application file for complete search history.

(56) References Cited

U.S. PATENT DOCUMENTS

| | | | |
|---|---|---|---|
| 3,435,666 A | 4/1969 | Fann | |
| 3,875,791 A * | 4/1975 | Fitzgerald | G01N 11/14 73/54.35 |
| 3,935,729 A * | 2/1976 | McCarthy | G01N 11/10 73/54.35 |

(Continued)

FOREIGN PATENT DOCUMENTS

WO 2013/126179 A1 8/2013

OTHER PUBLICATIONS

International Search Report and Written Opinion issued in related PCT Application No. PCT/US2017/025280 dated Dec. 1, 2017, 16 pages.

*Primary Examiner* — Alexander A Mercado
(74) *Attorney, Agent, or Firm* — Kilpatrick Townsend & Stockton LLP

(57) ABSTRACT

Viscosity assemblies may be used to determine the viscosity of a sample fluid at a surface location under one or more downhole conditions prior to pumping or flowing of the sample fluid downhole. A viscosity assembly may include a bob assembly disposed in a container that includes a bob disposed about a magnet rotor that rotates when a shear force is applied by the flow of the sample fluid in the container. A stator coil may receive a control signal that induces a force or a voltage that causes the magnet rotor to rotate the bob by a predetermined distance to position the bob from the rotated position back to the initial position.

20 Claims, 8 Drawing Sheets

(56) References Cited

U.S. PATENT DOCUMENTS

| | | | | |
|---|---|---|---|---|
| 4,299,119 A * | 11/1981 | Fitzgerald | G01N 11/14 | 73/54.32 |
| 4,373,147 A * | 2/1983 | Carlson, Jr. | H02K 16/025 | 310/112 |
| 4,448,061 A * | 5/1984 | Brookfield | G01N 11/14 | 73/54.33 |
| 4,484,468 A * | 11/1984 | Gau | G01N 11/14 | 702/50 |
| 4,501,155 A * | 2/1985 | Garritano | G01N 3/24 | 73/847 |
| 4,557,142 A | 12/1985 | Hensley et al. | | |
| 5,167,143 A | 12/1992 | Brookfield | | |
| 5,535,619 A | 7/1996 | Brookfield | | |
| 6,218,751 B1 * | 4/2001 | Bohlin | F16C 32/0417 | 310/90.5 |
| 6,951,127 B1 | 10/2005 | Bi | | |
| 7,287,416 B1 * | 10/2007 | Bi | G01N 11/14 | 73/54.23 |
| 7,412,877 B1 * | 8/2008 | Bi | G01N 11/14 | 73/54.23 |
| 8,375,771 B1 * | 2/2013 | Bi | G01N 11/14 | 73/54.33 |
| 8,813,542 B1 * | 8/2014 | Bi | G01N 11/14 | 73/54.28 |
| 2003/0084708 A1 * | 5/2003 | Abnett | G01N 11/14 | 73/54.28 |
| 2008/0034844 A1 * | 2/2008 | Manneville | G01N 11/10 | 73/54.23 |
| 2011/0198187 A1 * | 8/2011 | Lukay | G01N 11/14 | 192/84.1 |
| 2012/0048008 A1 | 3/2012 | Pindiprolu et al. | | |
| 2014/0311226 A1 * | 10/2014 | Murray | B01L 7/00 | 73/54.42 |
| 2015/0198512 A1 * | 7/2015 | Montgomery | G01N 33/383 | 73/843 |
| 2015/0233807 A1 * | 8/2015 | Santner | G01N 11/14 | 73/54.31 |
| 2019/0331577 A1 * | 10/2019 | Leyser | G01N 33/86 | |

\* cited by examiner

ACTIVE SENSOR FOR TORQUE MEASUREMENT IN A VISCOMETER

CROSS-REFERENCE TO RELATED APPLICATION

The present application is a U.S. National Stage Application of International Application No. PCT/US2017/025280 filed Mar. 31, 2017, which is incorporated herein by reference in its entirety for all purposes.

TECHNICAL FIELD

This application relates generally to providing an active sensor for torque measurement in a viscometer for various fluids. More specifically, the application relates to measuring torque using a bob assembly for torque measurement in a viscometer.

BACKGROUND

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, cementing the well, treating the wellbore to optimize production of hydrocarbons, and performing the necessary steps to produce and process the hydrocarbons from the subterranean formation.

Various types of fluids are used in the well servicing and production operations. Non-limiting examples include drilling muds, cement slurries, and stimulation treating fluids. Such fluids are typically pumped into a well in known manners. Generally, one or more characteristics of the fluids are determined to predict or estimate how such fluids will act upon being pumped and placed in, or circulated through, a well. For example, fluids used downhole are often exposed to unique conditions, including high pressures and temperatures.

Viscosity, elasticity, and consistency are rheological characteristics or properties that may be measured for a given fluid. Typical devices for testing fluids for any of these characteristics include viscometers, rheometers, and consistometers. However, downhole pressures and temperatures may change the characteristics of a fluid. As a result, the fluid characteristics measured at the surface may be inconsistent with how the fluid behaves within the well environment. Fluids are typically chosen for an operation based on favorable properties or characteristics, such as an ability to suspend particulates. It is therefore desirable to measure fluid properties, including viscosity, of a fluid under downhole conditions at the surface before the fluid is placed in the well.

BRIEF DESCRIPTION OF THE DRAWINGS

Some specific exemplary embodiments of the disclosure may be understood by referring, in part, to the following description and the accompanying drawings.

Figure 1:
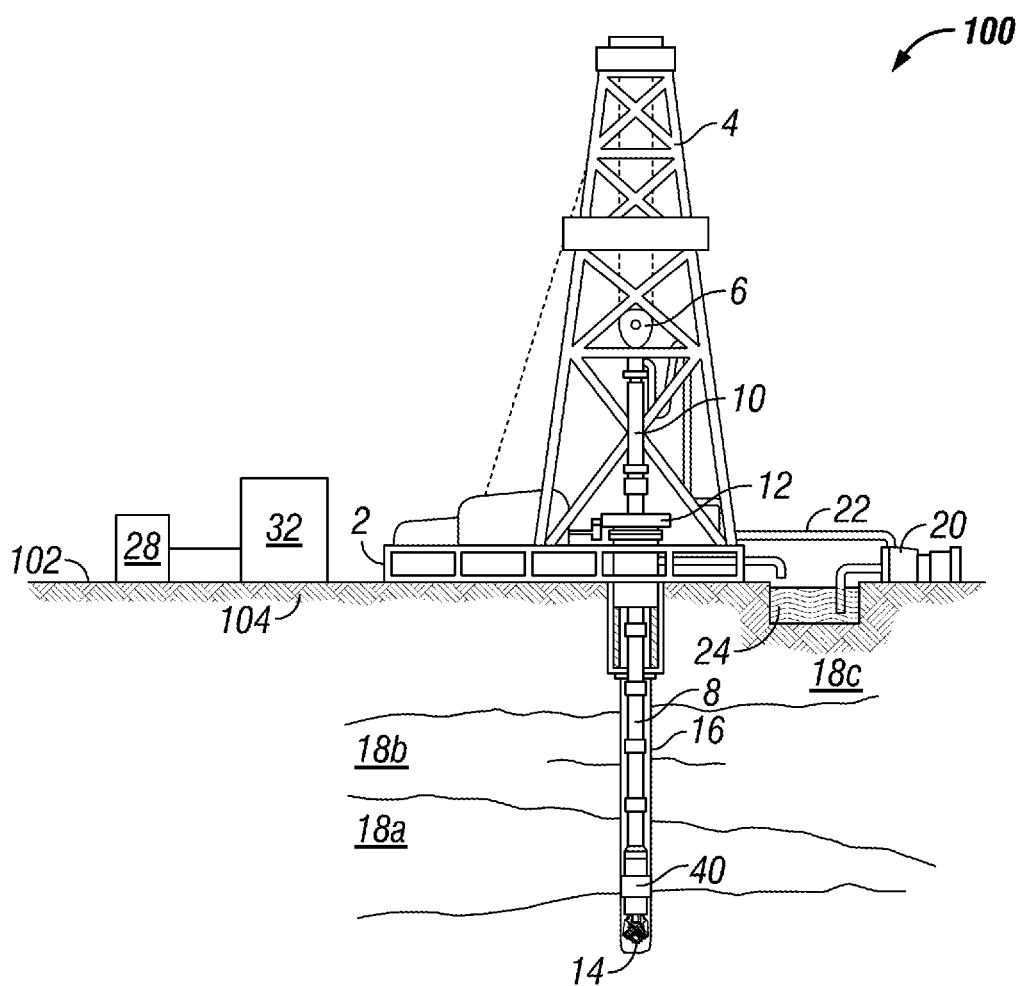
FIG. 1 is a diagram showing an illustrative drilling environment, according to one or more aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Certain aspects and features of the present disclosure relate to an active sensor for torque measurement in a viscometer. Throughout this disclosure viscometer and rheometer are used interchangeably. Similarly, throughout this disclosure viscosity and rheology are used interchangeably. In typical viscosity assemblies, a cup or container is rotated against fluid and a free suspended bob experiences a torque depending on the viscosity of the fluid which is measured using one or more springs. However, the stiffness of the spring limits the range and resolution of any measurement. To measure a density of a fluid a spring may require a very light stiffness but even a slight force may max the deflection of the spring. In contrast, a tight or very stiff spring may require a force not applicable to many fluids. For example, a fluid at rest may have one viscosity and another after a shear force is applied which cannot be accurately measured by a spring as either the resolution or the range of the spring is not adequate. Typical viscosity assemblies utilize jewel bearings to compensate for friction and inertia that are delicate making transportation difficult. Also, such typical viscosity assemblies utilize a hollow bob that for high viscosity fluids introduces errors due to introduction of a buoyancy. Due to the variation in the rheological properties of many fluids, for example, well production and servicing fluids, typical viscometers and rheometers do not provide the range and resolution to verify the rheological properties of the fluids. In one or more aspects of the present disclosure, a viscosity assembly does not necessitate the use of jewel bearings or springs but rather relies on electronic compensation for friction and inertia while still enabling low torque measurements. For example, according to one or more aspects of the present disclosure, a viscosity assembly provides for a highly sensitive torque measurement by utilizing a reactionary torque producing element or device magnetically coupled to a shaft that senses minute angular displacements.

According to one or more aspects of the present disclosure, an information handling system comprising a non-transitory computer readable medium may be utilized. For the purposes of this disclosure, computer-readable media may include any instrumentality or aggregation of instrumentalities that may retain data and/or instructions for a period of time. Computer-readable media may include, for example, without limitation, storage media such as a direct access storage device (for example, a hard disk drive or floppy disk drive), a sequential access storage device (for example, a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would, nevertheless, be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. Thus, as an example (not shown in the drawings), widget "1A" refers to an instance of a widget class, which may be referred to collectively as widgets "1" and any one of which may be referred to generically as a widget "1". In the figures and the description, like numerals are intended to represent like elements.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would, nevertheless, be a routine undertaking for those of ordinary skill in the art having the benefit of the present disclosure.

FIG. 1 is a diagram of an illustrative drilling environment 100, according to one or more aspects of the present disclosure. The drilling environment 100 comprises a drilling platform 2 positioned at the surface 102. In the embodiment shown, the surface 102 comprises the top of a formation 104 containing one or more rock strata or layers 18a, 18b, 18c, and the drilling platform 2 may be in contact with the surface 102. In other embodiments, such as in an off-shore drilling operation, the surface 102 may be separated from the drilling platform 2 by a volume of water.

The drilling system 100 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16. The drilling environment 100 may comprise any number and types of downhole tools. In one or more embodiments, a bottom hole assembly (BHA) 40 coupled to the drill string 8 near the drill bit 14 may comprise one or more downhole tools. The BHA 40 may comprise various downhole measurement tools and sensors and logging while drilling and measurement while drilling elements.

In certain embodiments, the drilling environment 100 may comprise an information handling system 32 positioned at the surface 102. The information handling system 32 may be communicably coupled to a viscometer assembly 28 that provides on site torque measurements according to one or more aspects of the present disclosure for a fluid to be pumped downhole, for example, a drilling fluid. The information handling system 32 may also receive data from any component of the BHA 40 or any one or more downhole tools of the drill string 8 when retrieved at the surface 102. In one or more embodiments, information handling system 32, viscometer assembly 28 or both may be located remote from the drilling environment 100.

Figure 2:
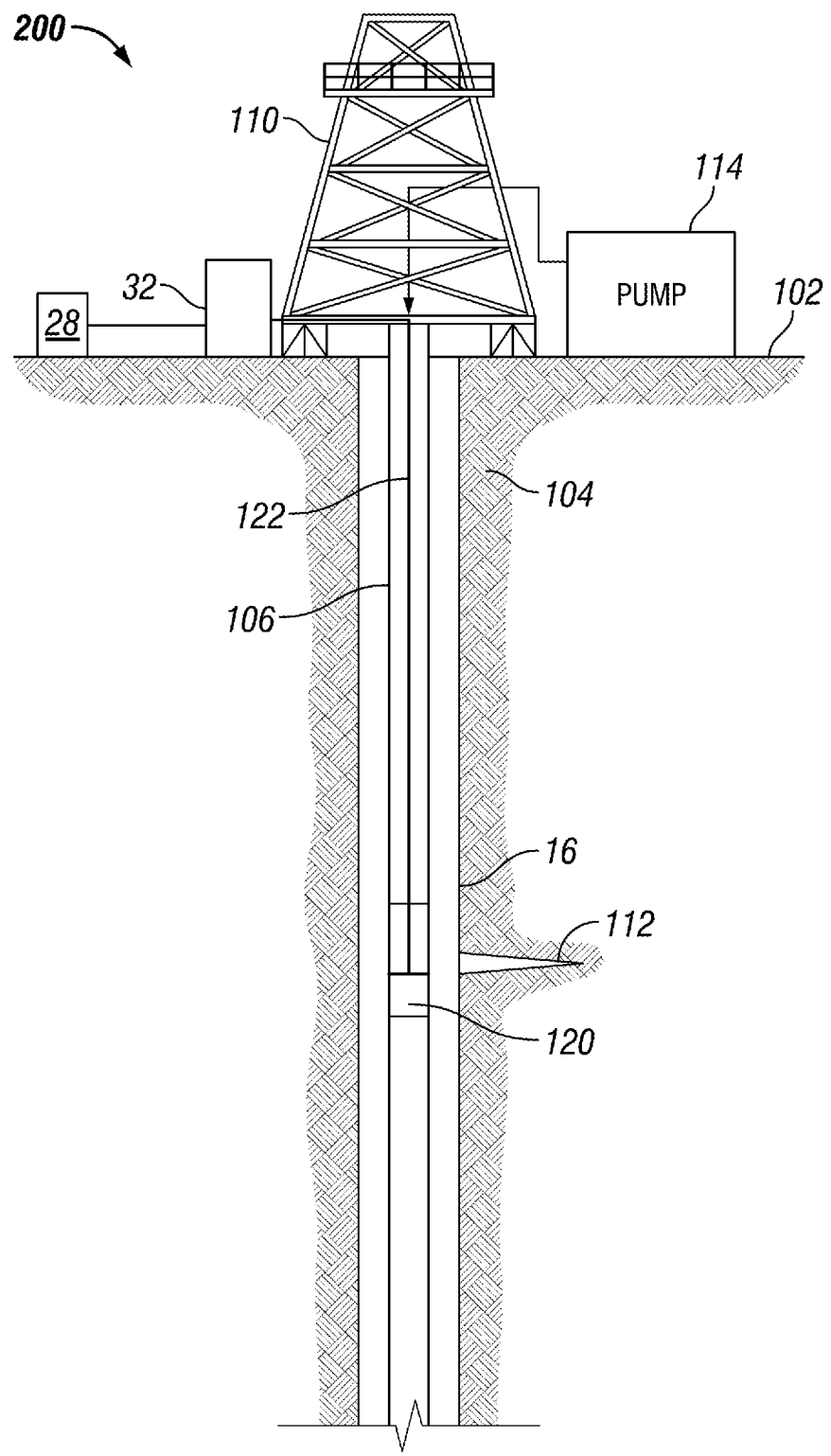
FIG. 2 is a diagram showing an illustrative well system, according to one or more aspects of the present disclosure.

FIG. 2 is a diagram showing an illustrative well system, according to one or more aspects of the present disclosure. The well environment 200 includes a derrick 110 positioned at a surface 102. The derrick 110 may support components of the well environment 200, including a tubing string 106. The tubing string 106 may include segmented pipes that extend below the surface 102 and into a wellbore 16. The wellbore 16 may extend through subterranean formation 104 in the earth adjacent to the wellbore 16. The subterranean formation 104 may include a perforation, an opening or a fracture 112, referred to generally herein as fracture 112. In some aspects, the fracture 112 may be a separation of the subterranean formation 104 forming a fissure or crevice in the subterranean formation 104. In additional aspects, the fracture 112 may be created by a fracturing process in which highly pressured gas is forced into the formations 110 via perforating tool system or assembly 120. A pump 114 is positioned at the surface 102 proximate to the wellbore 16 to pump a fluid into the wellbore 16. The fluid may be pumped into the wellbore at a rate to expand the fracture 112 or to fill a perforation or fracture 112. The fracture 112 may serve as a path for the production of hydrocarbons from subterranean reservoirs. Proppant and other additives may be added to the fluid during or prior to the fluid traversing the pump 114. The proppant may remain in the fracture 112 after the fracturing process is completed to keep the fracture 112 from completely closing.

A perforating tool system 120 may also be positioned or deployed downhole. In one or more embodiments, perforating tool system 120 may be positioned along, included with or coupled to the tubing string 106, a bottom-hole assembly, or any other suitable downhole deployment device or tool. The perforating tool system 120 may be coupled via an electrical connection 122 to an information handling system 32 at the surface 102.

Information handling system 32 may be coupled to a viscometer assembly 28 at the surface 102. The viscometer assembly 28 may provide on-site measurements, according to one or more aspects of the present invention, for the fluid prior to the fluid being pumped down wellbore 16. In one or more embodiments, information handling system 32, viscometer assembly 28 or both may be located remote from the well environment 200.

Figure 3:
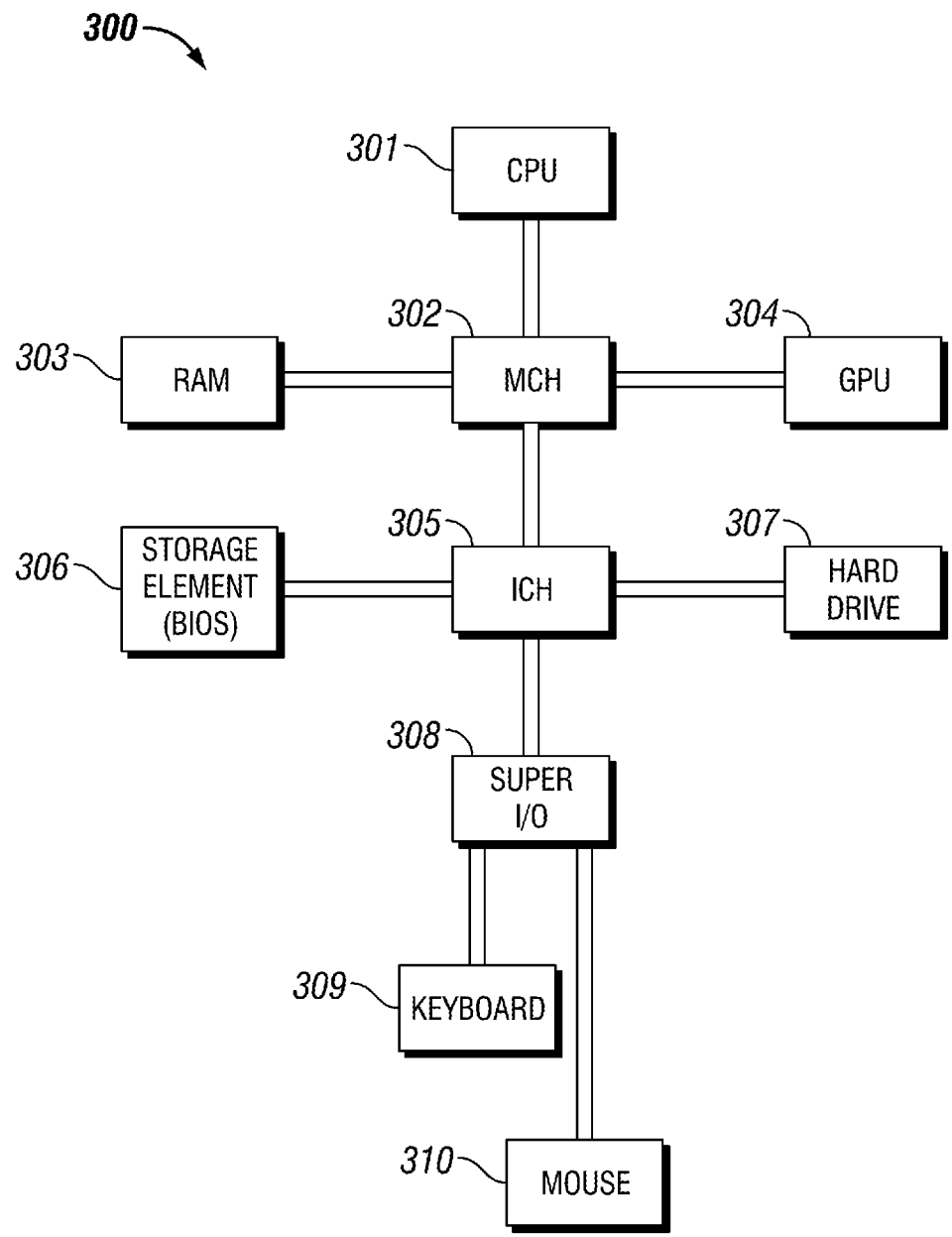
FIG. 3 is a diagram illustrating an example information handling system, according to one or more aspects of the present disclosure.

FIG. 3 is a diagram illustrating an example information handling system 300, according to one or more aspects of the present disclosure. The information handling system 32 of FIG. 1 and FIG. 2 may take a form similar to the information handling system 300 or include one or more components of information handling system 300. A processor or central processing unit (CPU) 301 of the information handling system 300 is communicatively coupled to a memory controller hub (MCH) or north bridge 302. The processor 301 may include, for example a microprocessor, microcontroller, digital signal processor (DSP), application specific integrated circuit (ASIC), or any other digital or analog circuitry configured to interpret and/or execute program instructions and/or process data. Processor (CPU) 301 may be configured to interpret and/or execute program instructions or other data retrieved and stored in any memory such as memory 303 or hard drive 307. Program instructions or other data may constitute portions of a software or application for carrying out one or more methods described herein. Memory 303 may include read-only memory (ROM), random access memory (RAM), solid state memory, or disk-based memory. Each memory module may include any system, device or apparatus configured to retain program instructions and/or data for a period of time (e.g., computer-readable non-transitory media). For example, instructions from a software or application may be retrieved and stored in memory 303 for execution by processor 301.

Modifications, additions, or omissions may be made to FIG. 3 without departing from the scope of the present disclosure. For example, FIG. 3 shows a particular configuration of components of information handling system 300. However, any suitable configurations of components may be used. For example, components of information handling system 300 may be implemented either as physical or logical components. Furthermore, in some embodiments, functionality associated with components of information handling system 300 may be implemented in special purpose circuits or components. In other embodiments, functionality associated with components of information handling system 300 may be implemented in configurable general purpose circuit or components. For example, components of information handling system 300 may be implemented by configured computer program instructions.

Memory controller hub (MCH) 302 may include a memory controller for directing information to or from various system memory components within the information handling system 300, such as memory 303, storage element 306, and hard drive 307. The memory controller hub 302 may be coupled to memory 303 and a graphics processing unit (GPU) 304. Memory controller hub 302 may also be coupled to an I/O controller hub (ICH) or south bridge 305. I/O controller hub 305 is coupled to storage elements of the information handling system 300, including a storage element 306, which may comprise a flash ROM that includes a basic input/output system (BIOS) of the computer system. I/O controller hub 305 is also coupled to the hard drive 307 of the information handling system 300. I/O controller hub 305 may also be coupled to a Super I/O chip 308, which is itself coupled to several of the I/O ports of the computer system, including keyboard 309 and mouse 210.

In certain embodiments, an information handling system 300 may comprise at least a processor and a memory device coupled to the processor that contains a set of instructions that when executed cause the processor to perform certain actions. In any embodiment, the information handling system may include a non-transitory computer readable medium that stores one or more instructions where the one or more instructions when executed cause the processor to perform certain actions. As used herein, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a computer terminal, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 4:
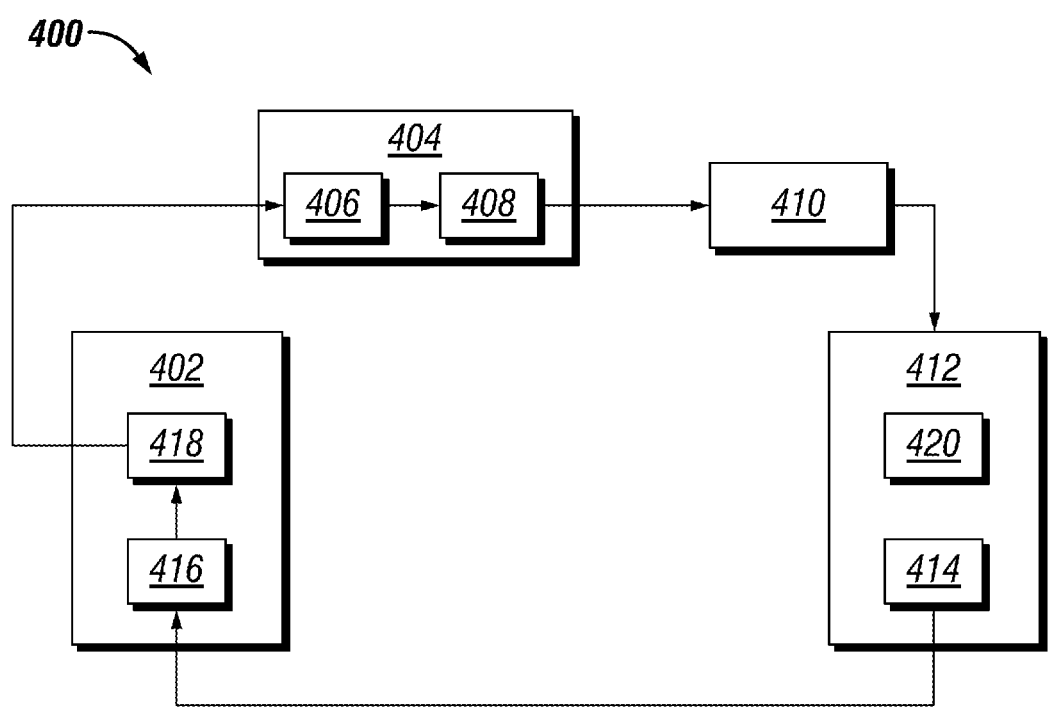
FIG. 4 is a diagram showing an illustrative viscosity assembly, according to one or more aspects of the present disclosure.

Referring now to FIG. 4, an illustrative diagram of a viscosity assembly 400 is shown, according to one or more aspects of the present disclosure. A viscosity assembly 400 may comprise an information handling system 402, an amplifier system 404, a counter-torque assembly 410, and a bob assembly 412. The information handling system 402 may comprise any one or more information handling systems 300. The information handling system 402 may comprise a positional controller 416 and a proportional integral derivative (PID) controller 418. The bob assembly 412 may comprise any type of bob configuration according to one or more aspects of the present disclosure. The bob assembly 412 may comprise a positional sensor 414. In one or more embodiments, the positional sensor 414 may be disposed or positioned within, at or about or proximate to the bob assembly 412 or may be coupled to the bob assembly 412. Positional information associated with the bob assembly 412 may be communicated via positional sensor 414 or any other suitable manner to positional controller 416. Positional controller 416 may comprise a hardware device, a software program or any combination thereof. For example, positional controller 416 may comprise a differential amplifier with a stable reference voltage. In one or more embodiments, positional controller 416 may be remote from information handling system 402. Positional controller 416 may communicate positional information of the bob assembly 412 to the PID controller 418. PID controller 418 may comprise a hardware device, a software program or both. PID controller 418 determines a positional error value. For example, the PID controller 418 determines a difference between a measured process variable (the positional information from the positional controller 416, for example, a rotated distance of the bob 420) and a desired set point (the initial predetermined position information of a bob 420 for the bob assembly 412) to generate an positional error output. The positional error output is used to adjust the torque to counter-rotate the bob assembly 412. In one or more embodiments, any one or more of the PID controller 418 and the positional controller 416 may be implemented by a single device or component, multiple devices or components or by any one or more other information handling systems 300.

An inertial compensation and a friction compensation may be predetermined or determined by the information handling system 402 for the viscosity assembly 400 and used to determine a compensation voltage, or the voltage necessary for the bob assembly 412 to experience a start of a rotation. The compensation voltage may be predetermined or known for a given bob assembly 412. The amplifier system 404 may comprise a summing amplifier 406 and a bidirectional linear amplifier 408. The compensation voltage is combined with the positional error output from the PID controller 418 by summing amplifier 406 to generate a positional rotation signal indicative of the amount of rotation by a bob 420 in the bob assembly 412. Summing amplifier 406 outputs or transmits the positional rotation signal to the bidirectional linear amplifier 408. Bidirectional linear amplifier 408 generates a counter torque current or a counter torque control signal. The counter torque control signal is transmitted by the bidirectional linear amplifier 408 to the counter torque device 410. In one or more embodiments, any one or more of the summing amplifier 406 and the bidirectional linear amplifier 408 may be implemented by any one or more devices or components and may be implement by a hardware device, a software program or both. In one or more embodiments, a torque current to adjust the bob 404 is generated using electric magnets. In one or more embodiments, the bob 420 is adjusted by using a linear activator pushing against a lever. Amplifier system 404 may comprise any one or more operational amplifiers for generating a counter torque control signal based on positional information of the bob 420 and a predetermined resistance torque due to friction and a predetermined resistance torque due to inertia.

The counter torque control signal energizes the counter torque device 410. Counter torque device 410 induces a counter torque force based, at least in part, on the counter torque control signal. For example, a plurality of windings of the counter torque device 410 may be energized to induce a magnetic field. The counter torque device 410 rotates the bob 420 back to the initial predetermined position or original position of the bob 420. Counter torque device 410 may be any mechanical or electrical device including one or more hardware devices, one or more software programs or both. The viscosity of a fluid may be determined based, at least in part, on the counter torque force. In one or more embodiments, the viscosity of the fluid may be determined for a temperature of the fluid, a pressure of the fluid, or both. In one or more embodiments, the temperature of the fluid, the pressure of the fluid or both are altered or adjusted and the viscosity of the fluid is determined or measured. For example, the viscosity of the fluid may be determined for a range or a plurality of temperatures, a range or a plurality of pressures or both.

Figure 5:
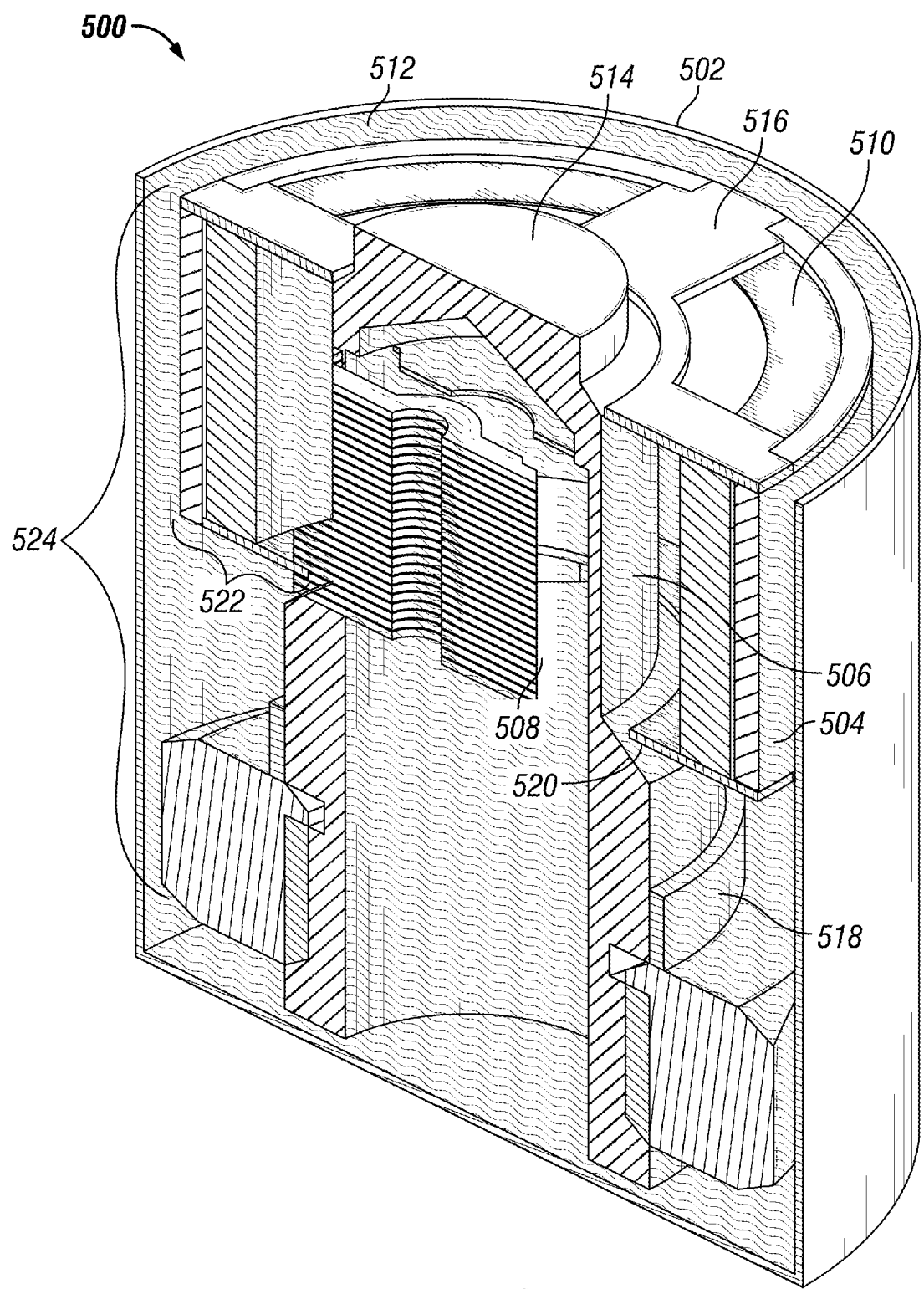
FIG. 5 is a diagram illustrating a cross-section of a partial viscosity assembly, according to one or more aspects of the present disclosure.

FIG. 5 is a diagram illustrating a cross-section of a partial viscosity assembly 500 (for example, viscosity assembly 400 of FIG. 4), according to one or more aspects of the present invention. The viscosity assembly 500 may comprise a container 502, a bob assembly 524, and a sample fluid 512. Container 502 may remain stationary during any testing of the sample fluid 512. Container 502 may have a cylindrical shape that is larger than the bob assembly 524 such that the sample fluid 512 is disposed about or flows freely along the sides and bottom of the outer surface 504 of bob 522. Container 502 may comprise an opening at a top end or portion of the container 502 to receive the bob assembly 524 or allow positioning of the bob assembly 524 within the container 502.

In one or more embodiments, the bob assembly 524 may comprise bob 522 having an outer surface 504, a sleeve assembly 506, a stator coil 508, an electrical assembly 514 and a shaft 518. In one or more embodiments, the bob 522 may be hollow or may be a solid material, for example, a solid metal. The stator coil 508 may be disposed or positioned within the shaft 518. The stator coil 508 may provide positional information associated with the rotation of the bob 522, for example, as described with respect to positional sensor 414 of FIG. 4 and further with respect to FIG. 6, via electrical assembly 514 to an information handling system, for example, information handling system 402 of FIG. 4. Stator coil 508 may also create a counter torque force (such as a counter torque voltage) based on a control signal, for example a control signal from an amplifier assembly 404 as discussed with respect to FIG. 4, that rotates the bob 522 by a predetermined distance. For example, stator coil 508 may comprise a counter torque device 410 as discussed with respect to FIG. 4. A sleeve assembly 506 is disposed or positioned about the stator coil 508. Sleeve assembly 506 protects the stator coil 508 from the sample fluid 512.

The bob 522 may comprise or be coupled to a magnet rotor 510, a seal 520 and a support assembly 516. The support assembly 516 rotates about the shaft 518 and may be disposed or positioned about the shaft 518 to provide support for the outer surface 504 of the bob 522. The seal 520 may isolate any component of the bob 522 from fluid 512. A magnet rotor 510 is disposed or positioned about the sleeve assembly 506 and within the outer surface of the bob 522. Bob 522 rotates about the shaft 518 when a shear force is applied to the bob 522, for example, the force created by the flow of fluid 512 within the container 502. The magnet rotor 510 rotates the bob 522 about the shaft 518 in response to a force. For example, magnet rotor 510 may rotate bob 522 to an original or initial position based on an attraction force created by the stator coil 508 as discussed with respect to FIG. 6.

Figure 6:
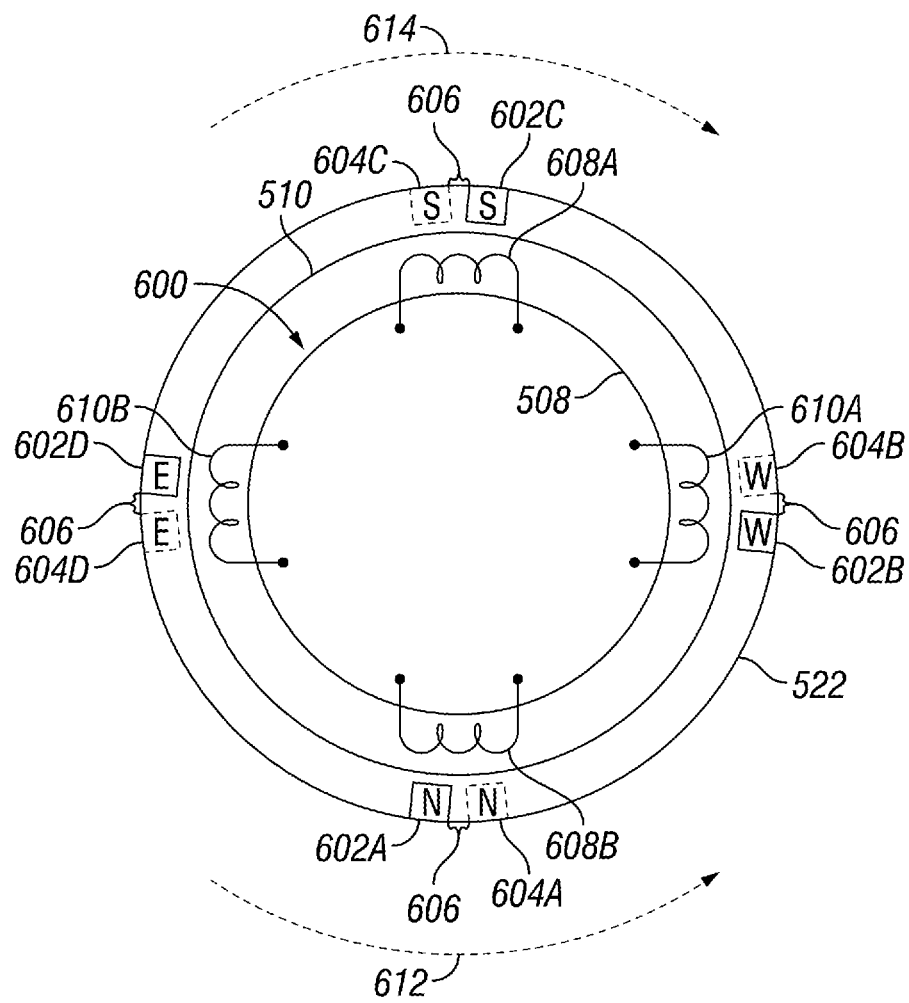
FIG. 6 is a diagram illustrating a positional sensor and counter-torque assembly for a bob, according to one or more aspects of the present disclosure.

FIG. 6 is a diagram illustrating a counter torque and positional sensor assembly 600 for a bob 522, according to one or more aspects of the present disclosure. In one or more embodiments, a stator coil 508 may comprise counter torque and positional sensor assembly 600. Positional sensor and counter torque assembly 600 may comprise a stator rotor 508 having a south pole sensor winding 608A and a north pole sensor winding 608B (collectively, sensor windings 608) disposed or positioned opposite each other. The sensor windings 608B may provide positional information associated with the position of the bob 522 (for example, as discussed with respect to positional sensor 414 in FIG. 4). For example, the bob 522 may be positioned at an initial position as indicated by 602A (indicative of a north "N" position coordinate), 602B (indicative of a west "W" position coordinate), 602C (indicative of a south "S" position coordinate) and 602D (indicative of an east "E" position coordinate). The bob 522 may rotate in a rotational direction 612 about a shaft (for example, about a shaft 518 in FIG. 5) due to a shear force (for example, a force due to a flow of fluid 512 in FIG. 5) by a rotational distance 606 to a rotated position as indicated by 604A, 604B, 604C and 604D. Sensor windings 608 may transmit information associated with the rotated position via a communications path, for example, the electrical assembly 514 in FIG. 5, to an information handling system, for example, to a positional controller 416 of information handling system 402 in FIG.

4. For example, the sensor windings 608 may sense the magnetic field created by the rotation of the magnet rotor 510. In one or more embodiments, the sensor windings 608 may comprise any suitable quantity of sensor windings 608. In one or more embodiments, any type of magnetic sensor, optical encoder or optical sensor may sense positional information associated with bob 522 instead of instead of or in addition to sensor windings 608.

Positional sensor and counter torque assembly 600 may comprise a west counter torque winding 610A and an east counter torque winding 610B (collectively, counter torque windings 610) disposed or positioned opposite each other. Counter torque windings 610 may receive a control signal indicative of the amount of counter torque required to rotate the bob 522 in a counter torque direction 614 from a rotated position to an initial position. For example, counter torque windings 610 may receive via electrical assembly 514 a control signal or a predetermined voltage that causes counter torque windings 610 to apply a counter torque voltage that creates an attraction force to the magnet rotor 510 to cause the bob 522 to rotate in a counter torque direction 614 from a rotated position as indicated by 604A, 604B, 604C and 604D to the initial position as indicated by 602A, 602B, 602C and 602D. In one or more embodiments, counter torque windings 610 may comprise any one or more counter torque windings.

Figure 7:
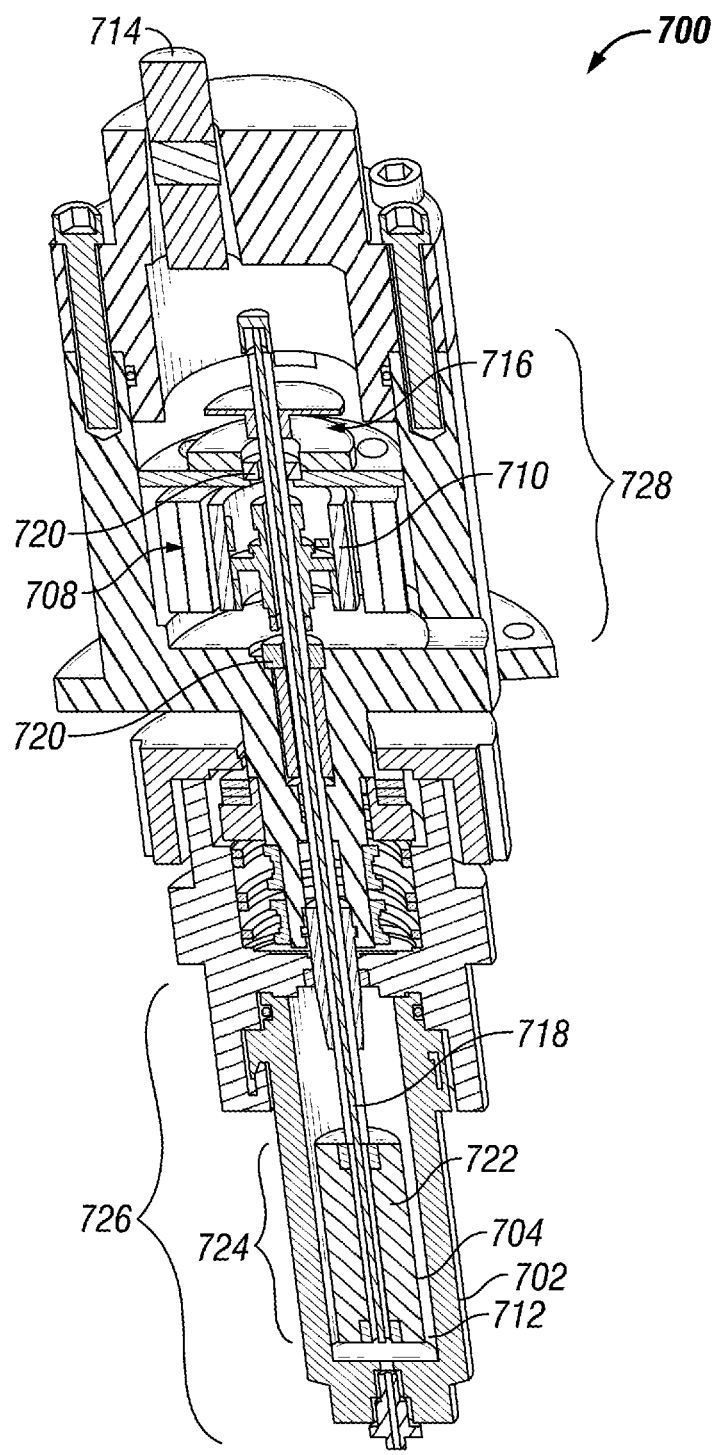
FIG. 7 is a diagram illustrating a cross-section of a partial viscosity assembly, according to one or more aspects of the present disclosure.

FIG. 7 is a diagram illustrating a cross-section of a partial viscosity assembly 700 (for example, viscosity assembly 400 of FIG. 4), according to one or more aspects of the present disclosure. The viscosity assembly 700 may comprise a container 702, a lower portion 726 and an upper portion 728. Lower portion 726 may comprise a bob assembly 724, a sample fluid 712 and a container 702. Container 702 may have a cylindrical shape that is larger than the bob assembly 724 such that the sample fluid 712 is disposed about or flows freely along the sides and bottom of the outer surface 704 of the bob 722. Container 702 may comprise an opening at a top end or portion of the container 702 to receive the bob assembly 724 or allow positioning of the bob assembly 724 within the container 702.

In one or more embodiments, the bob assembly 724 may comprise a bob 722 having an outer surface 704 disposed or positioned about a shaft 718 at a distal end of the viscosity assembly 700. In one or more embodiments, bob 722 may rotate about the shaft 718 due to a shear force applied to the bob 722 by the flow of the sample fluid 712. In one or more embodiments, the bob 722 may be hollow or may be a solid material, for example, a solid metal.

The upper portion 728 may comprise one or more bearings 720, a magnet rotor 710 disposed or positioned about the shaft 718, a stator coil 708 disposed or position about the magnet rotor 710 and one or more sensors 716. In one or more embodiments, the one or more sensors 716 may comprise magnetic coils, an optical encoder or an optical sensor that detect positional rotational of the bob 722 and that may communicate or transmit rotational positional information to an information handling system (for example, information handling system 402 of FIG. 4) via electrical assembly 714. The magnet rotor 710 may be coupled to the bob 722 and may operate in a similar or same manner as the magnet rotor 510 of FIG. 5 in that a force applied to magnet rotor 710 causes a rotation of bob 722. The stator coil 708 may comprise a magnetic core and may operate in a similar or same manner as the counter torque device 410 of FIG. 4 in that the stator coil 708 may receive a control signal via electrical assembly 714 from information handling system 402 or amplifier system 404 that causes the stator coil 708 to apply a force or voltage on the magnet rotor 710 to rotate the bob 722.

Figure 8:
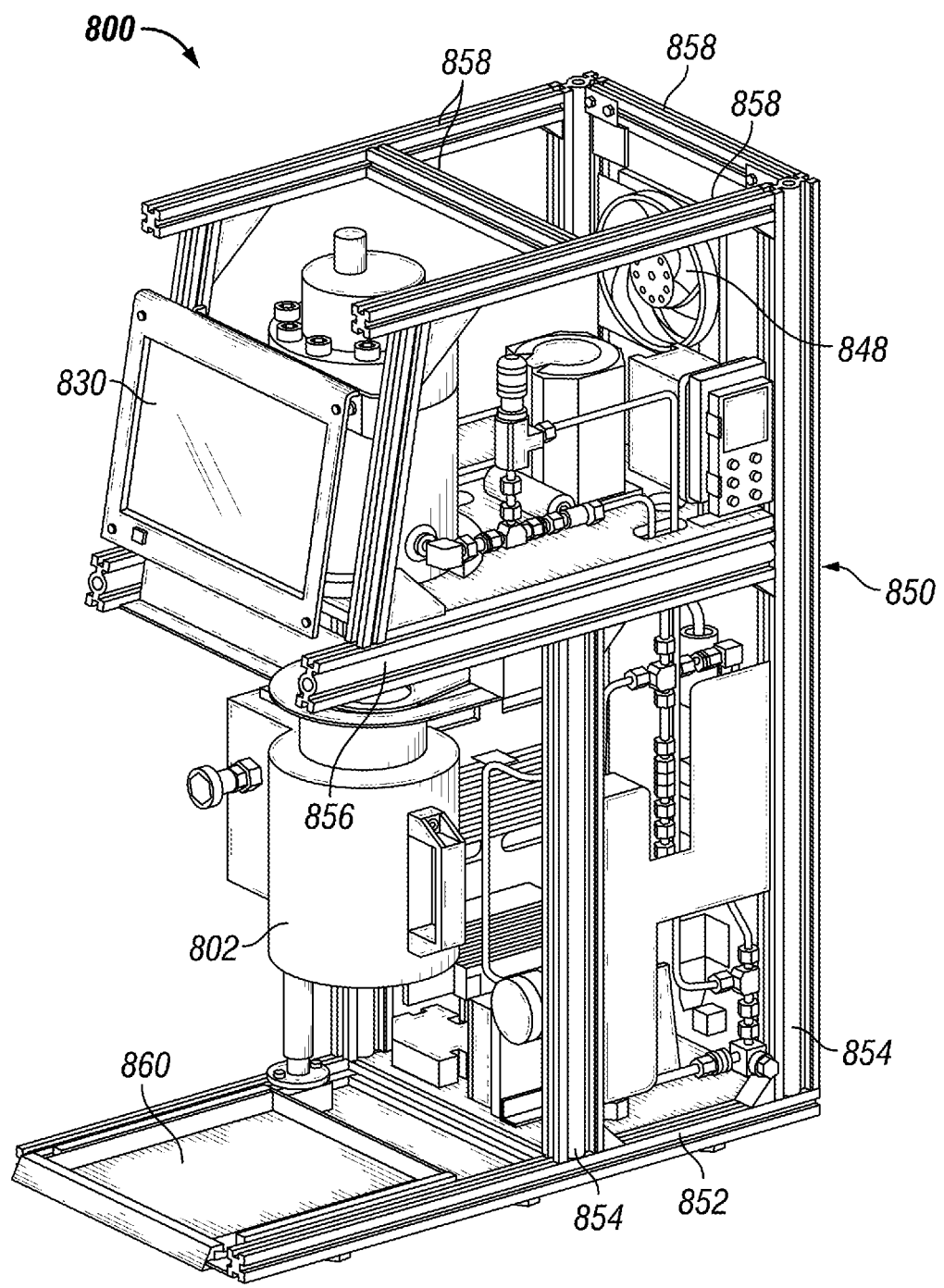
FIG. 8 is a diagram illustrating a viscosity assembly with an interface, according to one or more aspects of the present disclosure.

FIG. 8 is a diagram illustrating a viscosity assembly 800 with an interface, according to one or more aspects of the present disclosure. Viscosity assembly 800 may comprise a viscometer or a rheometer for measuring one or more rheological properties. In one or more embodiments, any one or more viscosity assemblies, for example, viscosity assembly 400 in FIG. 4, 500 in FIG. 5 or 700 in FIG. 7, may be mounted or otherwise affixed as part of a support structure 850. Support structure 850 may comprise a bottom surface 852, side rails 854, a middle platform or support 856, top rails 858. Side rails 854 and top rails 858 may comprise one or more panels, rails, bars, or any other type of support structure. Support structure 850 may comprise one or more side panels (not shown) to enclose any one or more components of the viscosity assembly 800. A fan 848 may be mounted to support structure 850 to provide cooling for one or more components of the viscosity assembly 800.

Viscosity assembly 800 may comprise an interface 830 mounted, positioned or disposed at, on or about the middle support platform 856. In one or more embodiments, interface 830 may be mounted anywhere about or within the viscosity assembly 800. Interface 830 may comprise any type of input/output device including, but not limited to, a display, a screen, a monitor, a touch-screen, a keypad, a keyboard, or any combination thereof.

A heater jacket 802 may couple to the middle support platform 856. A tray 860 may be disposed or positioned below the heater jacket 802. A container or chamber (not shown) may be disposed or positioned with the heater jacket 802. Tray 860 may be supported by bottom surface 852. Tray 860 may be removable or stationary.

In one or more embodiments, a viscosity measurement system comprises a shaft, a bob assembly disposed about the shaft, wherein the bob assembly comprises a bob, a container disposed about the bob assembly, a magnet rotor coupled to the bob, wherein the magnet rotor rotates the bob due to a force, a stator coil comprising a first winding and a second winding, wherein the first winding and the second winding are disposed opposite each other, and wherein the stator coil induces the force on the magnet rotor to cause the magnet rotor to rotate the bob and a positional sensor disposed about the shaft, wherein the positional sensor detects rotational position information associated with the bob. In one or more embodiments, the amplifier system generates a counter torque control signal. In one or more embodiments, the amplifier system comprises a summing amplifier and a bidirectional linear amplifier. In one or more embodiments, the viscosity measurement system further comprises a proportional integral derivative (PID) controller. In one or more embodiments, the magnet rotor is disposed within the bob assembly. In one or more embodiments, the stator coil comprises at least two sensor windings. In one or more embodiments, the stator coil is disposed about the magnet rotor.

In one or more embodiments, a method for determining a viscosity of a fluid comprises placing the fluid within a container, placing a bob within the container at an initial position, wherein the fluid flows about the bob, imparting a shear force by the fluid on a bob disposed within the container, determining a rotated distance of the bob from the initial position, determining a counter torque force required to rotate the bob in a counter torque direction by the rotated distance to position the bob at the initial position, inducing the counter torque force by a stator coil on a magnet rotor coupled to the bob to rotate the bob in the counter torque direction to the initial position and determining the viscosity of the fluid based, at least in part, on the counter torque force. In one or more embodiments, the method for determining the viscosity of the fluid further comprises communicating positional information associated with the bob to a controller and determining a positional error value based, at least in part, on the positional information. In one or more embodiments, the method for determining the viscosity of the fluid further comprises determining a friction compensation for the bob, determining an inertial compensation for the bob, determining a compensation voltage based on the friction compensation and the inertial compensation and wherein the counter torque force is based, at least in part, on the compensation voltage. In one or more embodiments, the method for determining the viscosity of the fluid further comprises determining a positional error based on the rotated distance and the initial position, generating a positional rotation signal based on the compensation voltage and wherein the counter torque force is based, at least in part, on the positional rotation signal. In one or more embodiments, inducing the counter torque force by the stator coil comprises energizing a plurality of windings to induce a magnetic field. In one or more embodiments, inducing the counter torque force by the stator coil comprises receiving a counter torque control signal, wherein the counter torque force is based on the counter torque control signal.

In one or more embodiments, a non-transitory computer readable medium storing one or more instructions that, when executed, causes a processor to rotate a bob disposed within a container from an initial position by causing a fluid within the container to impart a shear force on the bob, determine a rotated distance of the bob from the initial position, determine a counter torque force required to rotate the bob in a counter torque direction by the rotated distance to position the bob at the initial position, transmit a control signal to a stator coil to induce the counter torque force on a magnet rotor coupled to the bob to rotate the bob in the counter torque direction to the initial position and determine the viscosity of the fluid based, at least in part, on the counter torque force. In one or more embodiments, the one or more instructions that, when executed, further cause the processor to determine a positional error value based, at least in part, on positional information associated with the bob received from the stator coil. In one or more embodiments, the one or more instructions that, when executed, further cause the processor to determine a friction compensation for the bob, determine an inertial compensation for the bob, determine a compensation voltage based on the friction compensation and the inertial compensation and wherein the counter torque force is based, at least in part, on the compensation voltage. In one or more embodiments, the one or more instructions that, when executed, further cause the processor to determine a positional error based on the rotated distance and the initial position, generate a positional rotation signal based on the compensation voltage and wherein the counter torque force is based, at least in part, on the positional rotation signal. In one or more embodiments, the one or more instructions that, when executed, further cause the processor to wherein the control signal comprises a predetermined voltage. In one or more embodiments, the one or more instructions that, when executed, further cause the processor to altering at least one of a temperature or a pressure of the fluid.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee.

What is claimed is:

1. A viscosity measurement system, comprising:
    a shaft;
    a bob assembly disposed about the shaft, wherein the bob assembly comprises a bob, wherein the shaft is disposed through the bob, and wherein the bob is coupled to an outside of the shaft;
    a container disposed about the bob assembly;
    a magnet rotor coupled to the bob for rotating the bob due to a force, wherein the shaft is disposed through the magnet rotor, wherein the magnet rotor is coupled to the outside of the shaft;
    a stator coil comprising a first winding and a second winding for inducing the force on the magnet rotor to cause the magnet rotor to rotate the bob, wherein the first winding and the second winding are disposed opposite each other;
    a positional sensor disposed about the shaft to detect rotational position information associated with the bob; and
    a processor device configured to:
        cause a fluid within the container to impart a shear force on the bob that creates a torque on the bob to rotate the bob disposed within the container from an initial position;
        determine a rotated distance of the bob from the initial position;
        determine a counter torque required to rotate the bob by the rotated distance to position the bob back at the initial position;
        transmit a control signal to the stator coil to include a counter torque force on the magnet rotor to rotate the bob back to the initial position; and
        determine a viscosity of the fluid based, at least in part, on the counter torque.

2. The viscosity measurement system of claim 1, further comprising an amplifier system to generate a control signal.

3. The viscosity measurement system of claim 2, wherein the amplifier system comprises a summing amplifier and a bidirectional linear amplifier.

4. The viscosity measurement system of claim 2, further comprising a proportional integral derivative (PID) controller.

5. The viscosity measurement system of claim 1, wherein the magnet rotor is disposed within the bob assembly.

6. The viscosity measurement system of claim 1, wherein the stator coil comprises at least two sensor windings.

7. The viscosity measurement system of claim 1, wherein the stator coil is disposed about the magnet rotor.

8. A method for determining a viscosity of a fluid, comprising:
    placing the fluid within a container;
    placing a bob within the container at an initial position, wherein the fluid flows about the bob;

imparting a shear force by the fluid on the bob disposed within the container that creates a torque on the bob;

determining a rotated distance of the bob from the initial position;

determining a counter torque required to rotate the bob by the rotated distance to position the bob back at the initial position;

inducing the counter torque by a stator coil on a magnet rotor coupled to the bob to rotate the bob back to the initial position; and determining the viscosity of the fluid based, at least in part, on the counter torque.

9. The method for determining the viscosity of the fluid of claim 8, further comprising:

communicating positional information associated with the bob to a controller; and determining a positional error value based, at least in part, on the positional information.

10. The method for determining the viscosity of the fluid of claim 8, further comprising:

determining a friction compensation for the bob;

determining an inertial compensation for the bob;

determining a compensation voltage based on the friction compensation and the inertial compensation; and wherein the counter torque is based, at least in part, on the compensation voltage.

11. The method for determining the viscosity of the fluid of claim 10, further comprising:

determining a positional error based on the rotated distance and the initial position;

generating a positional rotation signal based on the compensation voltage; and wherein the counter torque is based, at least in part, on the positional rotation signal.

12. The method for determining the viscosity of the fluid of claim 8, wherein inducing the counter torque by the stator coil comprises energizing a plurality of windings to induce a magnetic field.

13. The method for determining the viscosity of the fluid of claim 8, wherein inducing the counter torque by the stator coil comprises receiving a counter torque control signal, wherein the counter torque is based on the counter torque control signal.

14. The method of claim 8, further comprising altering at least one of a temperature or a pressure of the fluid.

15. A non-transitory computer readable medium storing one or more instructions that, when executed, causes a processor to:

rotate a bob disposed within a container from an initial position by causing a fluid within the container to impart a shear force on the bob that creates a torque on the bob;

determine a rotated distance of the bob from the initial position;

determine a counter torque required to rotate the bob in a counter torque direction by the rotated distance to position the bob back at the initial position;

transmit a control signal to a stator coil to induce a counter torque on a magnet rotor coupled to the bob to rotate the bob back to the initial position; and determine a viscosity of the fluid based, at least in part, on the counter torque.

16. The non-transitory computer readable medium of claim 15, wherein the one or more instructions that, when executed, further cause the processor to determine a positional error value based, at least in part, on positional information associated with the bob received from the stator coil.

17. The non-transitory computer readable medium of claim 15, wherein the one or more instructions that, when executed, further cause the processor to:

determine a friction compensation for the bob;

determine an inertial compensation for the bob;

determine a compensation voltage based on the friction compensation and the inertial compensation; and wherein the counter torque is based, at least in part, on the compensation voltage.

18. The non-transitory computer readable medium of claim 15, wherein the one or more instructions that, when executed, further cause the processor to:

determine a positional error based on the rotated distance and the initial position;

generate a positional rotation signal based on a compensation voltage; and wherein the counter torque is based, at least in part, on the positional rotation signal.

19. The non-transitory computer readable medium of claim 15, wherein the control signal comprises a predetermined voltage.

20. The non-transitory computer readable medium of claim 15, wherein the one or more instructions that, when executed, further cause the processor to alter at least one of a temperature or a pressure of the fluid.

* * * * *